(12) United States Patent
Wisniewski

(10) Patent No.: US 11,355,032 B2
(45) Date of Patent: Jun. 7, 2022

(54) FIRE EXTINGUISHER TRAINING DEVICE

(71) Applicant: Northern Centre for Advanced Technology Inc., Sudbury (CA)

(72) Inventor: Edward Thomas Wisniewski, Sudbury (CA)

(73) Assignee: NORTHERN CENTRE FOR ADVANCED TECHNOLOGY, INC., Ontario (CA)

( * ) Notice: Subject to any disclaimer, the term of this patent is extended or adjusted under 35 U.S.C. 154(b) by 610 days.

(21) Appl. No.: 16/171,569

(22) Filed: Oct. 26, 2018

(65) Prior Publication Data

US 2020/0105160 A1    Apr. 2, 2020

(30) Foreign Application Priority Data

Oct. 2, 2018    (CA) ................................ CA 3019502

(51) Int. Cl.
| | | |
|---|---|---|
| *G09B 19/24* | (2006.01) | |
| *A62C 99/00* | (2010.01) | |
| *G09B 5/02* | (2006.01) | |

(52) U.S. Cl.
CPC .......... *G09B 19/24* (2013.01); *A62C 99/0081* (2013.01); *G09B 5/02* (2013.01)

(58) Field of Classification Search
CPC ................................... G09B 19/24; G09B 5/02
See application file for complete search history.

(56) References Cited

U.S. PATENT DOCUMENTS

| | | | | |
|---|---|---|---|---|
| 2,924,280 | A | * | 2/1960 | Carter .................. A62C 13/003 169/89 |
| 5,059,124 | A | | 10/1991 | Tsujita |
| 7,293,583 | B2 | * | 11/2007 | Arigoni ..................... E03D 5/10 137/624.11 |
| 7,748,983 | B2 | | 7/2010 | Blackburn et al. |
| 8,201,545 | B2 | * | 6/2012 | Soueidan ................ F41B 11/71 124/74 |
| 10,380,911 | B2 | * | 8/2019 | Hsu ......................... G09B 19/00 |

(Continued)

FOREIGN PATENT DOCUMENTS

| | | | |
|---|---|---|---|
| CA | 2227733 A1 | | 2/1997 |
| CN | 202871127 U | | 4/2013 |
| CN | 206946745 U | * | 1/2018 |

(Continued)

OTHER PUBLICATIONS

Huiwei, Mei and Xinrong, Yu. Fire control training system based on virtual reality technology, CN application No. 2017206018720, Jan. 30, 2018, 7pages (Year: 2018).*

(Continued)

*Primary Examiner* — Robert J Utama
(74) *Attorney, Agent, or Firm* — Ware, Fressola, Maguire & Barber LLP

(57) ABSTRACT

A fire extinguisher training device comprising a display device for displaying imagery of a fire, a holder for holding the display device, a central member to which the holder is mounted, and an electronic control module mounted to the central member. The device has a trigger mechanism and a trigger sensor for sensing movement of the trigger mechanism, wherein the electronic control module is communicatively connected to the trigger sensor and also to the display device.

18 Claims, 3 Drawing Sheets

(56) References Cited

U.S. PATENT DOCUMENTS

2015/0079559 A1    3/2015  Blackburn et al.
2015/0154884 A1*   6/2015  Salsich ................ B23K 9/0953
                                                      434/234

FOREIGN PATENT DOCUMENTS

CN      207233280 U  *  4/2018
JP        2212879 A     8/1990
JP         476592 A     3/1992

OTHER PUBLICATIONS

Mingle, Zhang. Fire control education simulated fire extinguisher based on virtual reality, CN application No. 201720424987 Apr. 13, 2018 (Year: 2018).*
English language Abstract of JP476592, relates to JPH07117812.
English language Abstract of JP212879, relates to JPH0648419.

* cited by examiner

FIRE EXTINGUISHER TRAINING DEVICE

CROSS-REFERENCE TO RELATED APPLICATIONS

This application claims benefit to Canadian application serial no. 3,019,502, filed 2 Oct. 2018, which is incorporated by reference in their entirety.

TECHNICAL FIELD

The present invention relates generally to fire extinguishers and, more particularly, to a training device for simulating a fire extinguisher.

BACKGROUND

A fire extinguisher is a hand-held cylindrical pressure vessel or tank that contains a fire-suppressing or fire-retarding substance that is expelled from the tank to extinguish a fire.

Various types of fire extinguisher training tools and simulators are known in the art. Some examples of these simulation tools are disclosed in U.S. Pat. Nos. 5,059,124, 7,748,983, US 2015/0079559, Canadian Patent 2,227,733 Chinese Utility Model CN202871127U, and Japanese Patents JPH07117812 and JPH0648419.

In general, the known extinguisher simulation technologies utilize a fixed display screen and sensors to determine the orientation of a modified or replica fire extinguisher. The display screen dynamically displays the virtual flames, showing how they are attenuated and extinguished in response to sensing the orientation of the extinguisher. There are, however, some drawbacks with this conventional approach to fire extinguisher training. Because the simulator employs a fixed display screen, the user must always face the screen to see the simulated effect of the extinguisher on the flames. The prior-art simulators also are limited in that they only simulate the effect of the orientation of the extinguisher on the flames and do not simulate other aspects of the extinguisher mechanism such as the pull pin and the trigger.

Improvements to the existing simulation technologies remain highly desirable in order to provide a more realistic simulation of a fire extinguisher.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a fire extinguisher training device (or training tool or training system) for simulating the use of a fire extinguisher in fighting a fire. The fire extinguisher training device includes a trigger mechanism having, for example, an upper handle and a lower handle. A trigger sensor senses movement of the trigger mechanism and transmits a signal to an electronic control module housed within a housing. The electronic control module is in communication with a display device such as a tablet. The display device is held by a holder that is connected to the housing. The simulated fire is displayed on the display device. When the user squeezes the trigger mechanism, the device will produce a simulated chemical spray with the user's current angle, distance and trajectory One inventive aspect of the disclosure is a fire extinguisher training device comprising a display device for displaying imagery of a fire, a holder for holding the display device, a central member to which the holder is mounted, and an electronic control module mounted to the central member. The device has a trigger mechanism and a trigger sensor for sensing movement of the trigger mechanism, wherein the electronic control module is communicatively connected to the trigger sensor and also to the display device.

Another inventive aspect of the disclosure is a method of simulating a fire extinguisher. The method entails displaying a simulation of a fire on a display device held by a holder mounted to a central member to which an electronic control module is mounted, sensing movement of a trigger mechanism by a trigger sensor and transmitting a signal from the electronic control module to the display device to cause the display device to simulate the fire extinguisher discharging a fire-suppressing substance toward the fire.

BRIEF DESCRIPTION OF THE DRAWINGS

These and other features of the disclosure will become more apparent from the description in which reference is made to the following appended drawings.

DETAILED DESCRIPTION OF EMBODIMENTS

Figure 1:
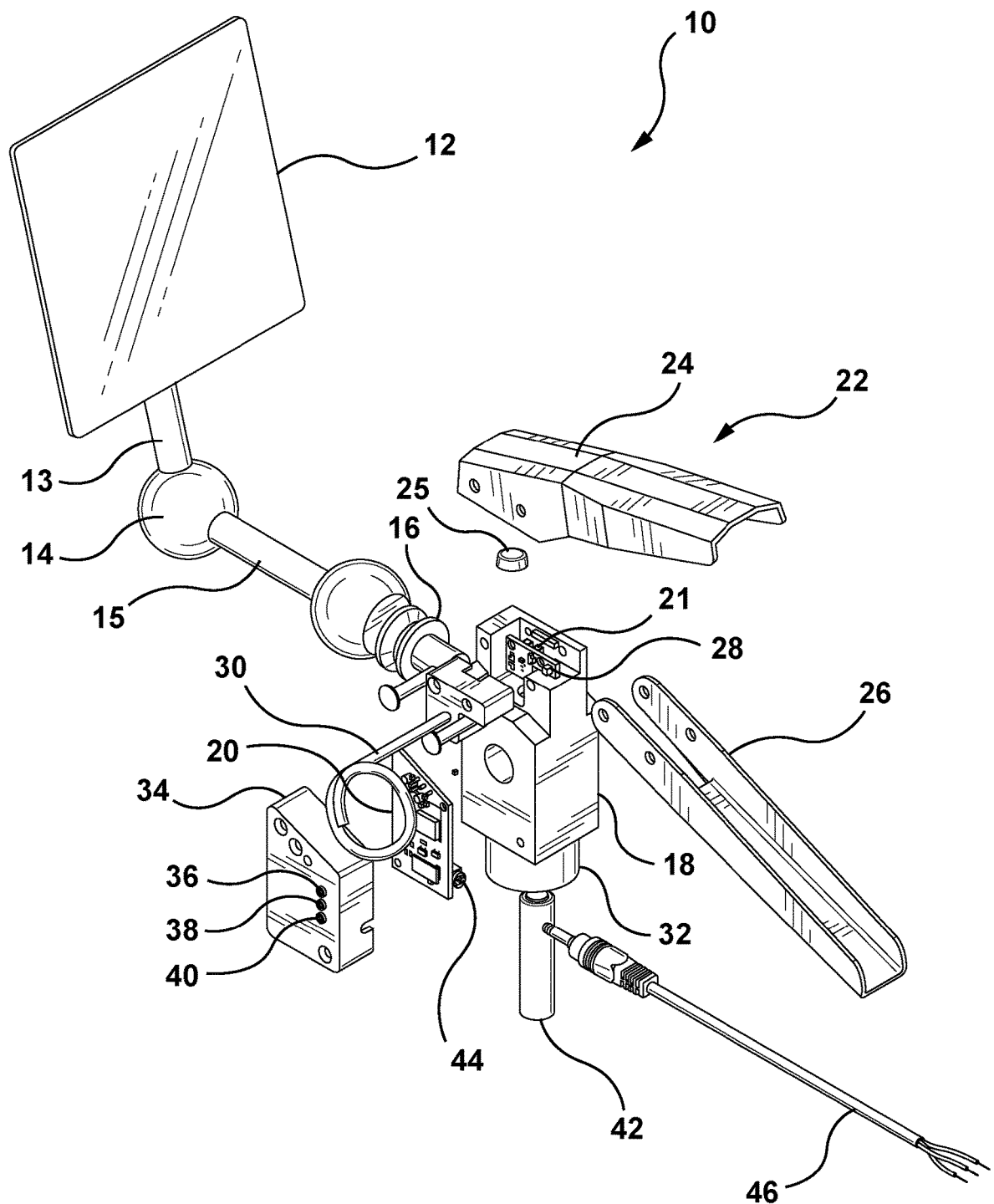
FIG. 1 is an exploded perspective view of a fire extinguisher training device in accordance with an embodiment of the present invention.
Figure 2:
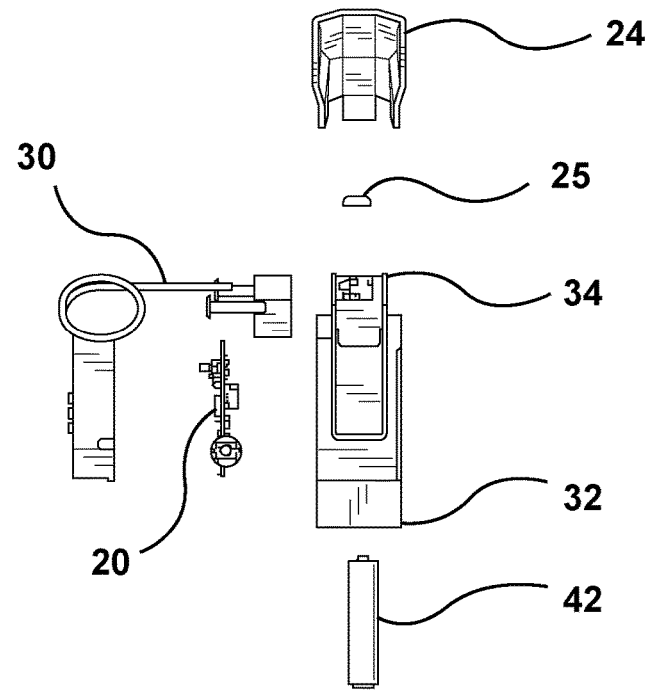
FIG. 2 is an exploded front view of the fire extinguisher training device of FIG. 1.
Figure 3:
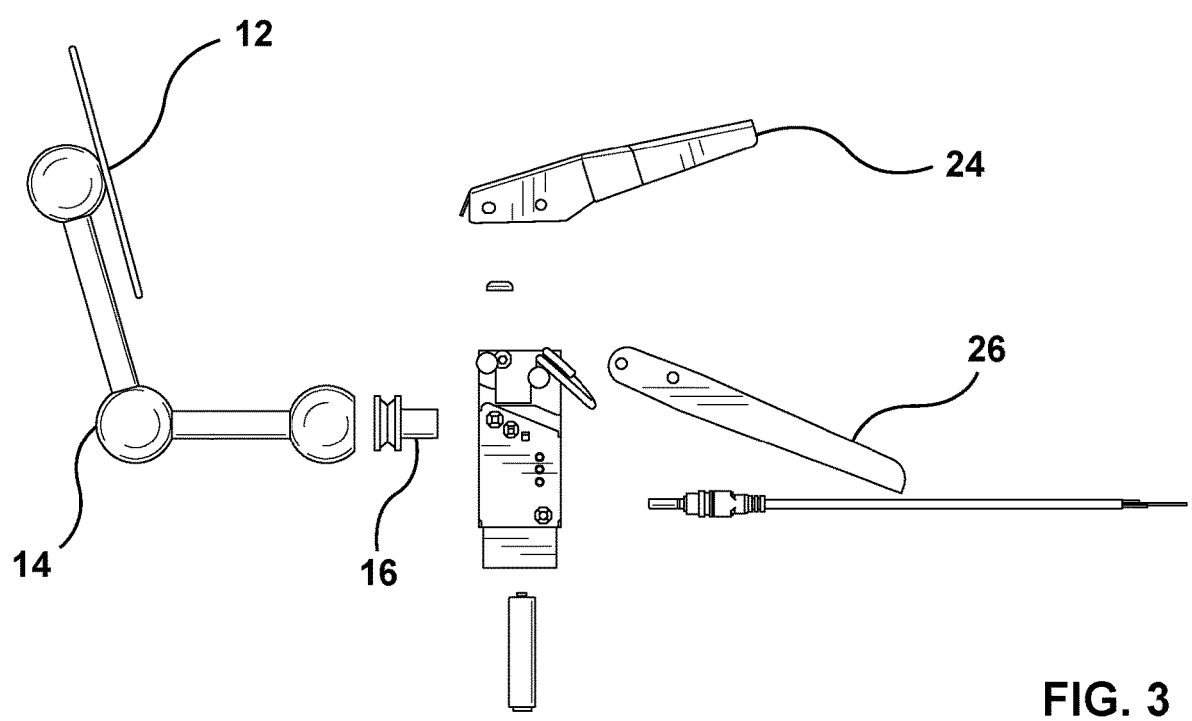
FIG. 3 is an exploded side view of the fire extinguisher training device of FIG. 1.
Figure 4:
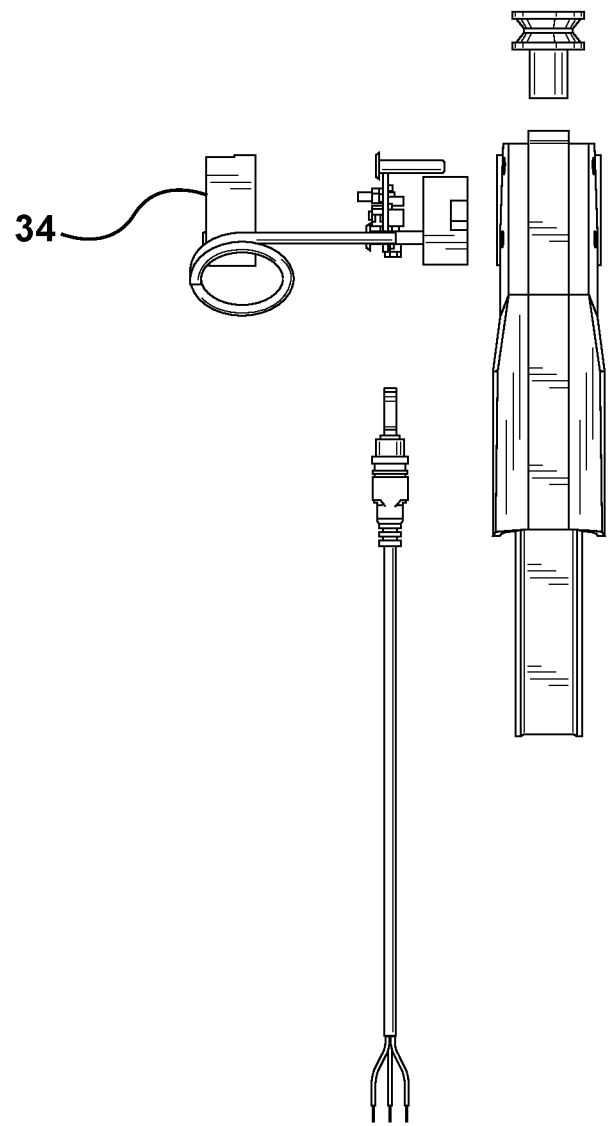
FIG. 4 is an exploded top view of the fire extinguisher training device of FIG. 1.

The following detailed description contains, for the purposes of explanation, one or more specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

An exemplary embodiment of the invention is depicted in FIGS. 1-4. It should be understood that this exemplary embodiment represents only one particular way of implementing this invention. In other words, variations, modifications and refinements may be made to the device presented herein without departing from the fundamental inventive concept(s).

FIGS. 1-4 depict a fire extinguisher training device designated generally by reference numeral 10 in accordance with an embodiment of the present invention. The fire extinguisher training device 10 may also be referred to synonymously as a fire extinguisher simulator, simulation tool, training tool, training system or simulation system. The device has a twin-handle trigger mechanism that is designed to look, feel, and act like the analogous mechanism of a real fire extinguisher. The device converts the user's movements, such as a handle squeeze and a pin pull, to digital data that a tablet or other display device can read in order to generate a real-time simulation.

The fire extinguisher training device 10 depicted in FIGS. 1-4 includes a display device 12 for displaying imagery of a fire. The display device 12 in the figures is a tablet (i.e. a computing tablet such as an Apple iPad, Samsung Galaxy Tab, Microsoft Surface Go, etc.) The tablet has a memory and a processor for storing and executing an application that is coded (i.e. programmed) to display the imagery of the fire to thus provide a fire-fighting simulation for training purposes. In some embodiments, the application executing on the tablet provides an augmented reality (AR) simulation to provide realistic training in operating a fire extinguisher. In one embodiment, the tablet may have a built-in augmented reality engine in the operating system (e.g. Apple's ARKit in iOS 11, which provides a framework for augmented reality applications). The application may thus cooperate with ARKit or any equivalent AR engine to provide the AR experience for the user of the device. The application is thus configured to dynamically display the fire and the effects of the fire-fighting actions taken by the user operating the fire extinguisher training device.

As illustrated by way of example in the figures, the fire extinguisher training device 10 includes a holder 14 for holding the display device 12. The holder may have an arm 13 and a boom 15 and a boom attachment 16 as shown as an example in FIG. 1.

The fire extinguisher training device 10 includes a central member (e.g. a center block) 18 to which the holder 14 is mounted (e.g. via the boom attachment 16). The fire extinguisher training device 10 further includes an electronic control module 20 mounted to the central member 18. The fire extinguisher training device 10 also has a trigger mechanism 22 and a trigger sensor 21 (e.g. an electronic module containing the trigger sensor) for sensing movement of the trigger mechanism 22. In the embodiment depicted in FIGS. 1-4, the trigger mechanism 22 comprises a spring-loaded upper handle 24 and a lower handle 26 which are connected to the central member 18. A spring 25 is connected to the upper handle 24 to mechanically bias the upper handle 24 away from the lower handle 26. In operation, the user squeezes the spring-loaded upper handle 24 toward the lower handle 26 to cause the display device to display a virtual representation of the fire-suppressing substance discharging from the fire extinguisher. This squeezing action is sensed by the trigger sensor 21 and communicated as a signal to the electronic control module 20 which communicates in turn with the display device 12. The trigger sensor may be an infrared (IR) sensor or any other suitable sensor. Thus, the electronic control module 20 is communicatively connected to the trigger sensor 21 and also to the display device 12. In the illustrated embodiment, the electronic control module 20 is communicatively connected to the display device 12 via a wireless connection, e.g. a Bluetooth® connection although another suitable short-range wireless communication technology may be used. In one specific embodiment, the wireless connection may utilize the Bluetooth® Low Energy protocol. Alternatively, in a variant, the electronic control module 20 could communicate with the display device 12 (e.g. tablet) via a suitable data cable or wireline connection.

The IR trigger sensor has an IR transmitter to emit IR waves and an IR receiver to read reflected IR waves. The IR trigger sensor is used to read infrared reflections from the bottom surface of the upper handle. When the handle is squeezed down, the bottom of the upper handle moves closer to the IR transmitter of the IR trigger sensor. This causes more IR reflection to be received into the IR receiver. The opposite effect happens when the handle is released. The change in height causes fewer reflections to be received by the IR receiver. The change in the amount or intensity of the reflections is processed by the electronic control module and converted into a digital value. The value is then sent via wireless link (e.g. Bluetooth Low Energy link) to the display device executing the application where the data is interpolated into an augmented spray displayed on screen.

In order to use the device with a given display device, the display device must first be calibrated. The application is configured to request an identifier from the electronic control module to determine if the application and the electronic control module have already been calibrated. When the application is launched on the tablet, the application will listen for the electronic control module to start communication and handshaking (synchronization). Once the power is turned on, the electronic control module will begin sending out BLE data stating that it is available for pairing. Once the application detects the electronic control module, pairing will start automatically. When the device is paired, the application will request a serial number and determine if the calibration procedure has been performed on that device. If no calibration data is available, the application will then ask the user to follow a series of steps reading all the minimum and maximum position data for the trigger mechanism, e.g. maximum and minimum position data for the upper handle from its resting position to its fully squeezed position. The application will save the calibration data for future boot-ups based on the serial number which is unique to each device.

In the embodiment depicted in FIGS. 1-4, the fire extinguisher training device 10 further includes a pin sensor 28 for detecting when a pin 30 is pulled from the central member. The pin sensor 28 may be an infrared (IR) pin sensor although other suitable types of pin sensors may be substituted. The IR pin sensor indicates an on/off condition for the pin, i.e. indicating whether the pin is inserted (device is locked and unable to spray) or removed (device is unlocked and ready to spray). When the pin is inserted, the IR beam from the IR transmitter to the IR receiver of the IR sensor will be broken or interrupted. The broken IR signal will indicate that the pin is currently inserted and the electronic control module will use its wireless link (e.g. BLE) to report an OFF condition. When the pin is pulled out, the IR signal will no longer be broken and the electronic control module will report an ON condition to the application executing in the tablet. The application will interpret these condition as Pin Inserted and Pin Pulled. If the pin is not pulled, pressing on the handle will not produce a fire-suppressant spray. For the spray to be displayed on the tablet, both conditions must be met, i.e. both the pin is pulled and the handle is squeezed.

In the embodiment depicted in FIGS. 1-4, the fire extinguisher training device 10 further has an adapter collar 32 to attach the central support to one of a plurality of differently sized tanks (not shown). In one specific embodiment, the lower handle may be designed to be attached to a small tank without an adapter collar. The adapter collar would then be used to attach 101b, 151b or 201b tanks. The adapter collar may have threads to attach to threaded tank openings.

In the embodiment depicted in FIGS. 1-4, the fire extinguisher training device 10 includes a housing 34 that is designed to attach to the central member for covering the electronic control module. The housing may have light indicators as shown in FIG. 1. The light indicators comprise, for example, a power LED 36, a charging LED 38 and a full tank LED 40. In this exemplary embodiment, the power LED 36 lights up when the device is turned on. The charging LED 38 may, for example, be red when charging and green when fully charged. In one exemplary embodiment, the full tank LED 40 will turn off when both the pin is pulled and the handle is squeezed indicating that the tank has been used. When the pin is re-inserted and the handle is reset to its resting position, the full tank LED 40 will reset to indicate that fire extinguisher training device is ready for another simulation session. In another embodiment, the fire extinguisher training device may have a digital gauge representing Full (100%) to Empty (0%). The fire extinguisher training device may have a power on/off button to enable the user to turn the device on and off. In one embodiment, after a period of inactivity, the device will power itself down to save battery life.

In the embodiment illustrated in FIGS. 1-4, the central support includes a battery compartment for receiving a battery 42, e.g. a rechargeable battery. The electronic control module 20 has a power connector or socket 44 for recharging the battery 42. The power connector or socket 44 is shaped to receive a charging cable 46. A standard 12-volt DC power supply may be used to recharge the battery although in other variants a different voltage may be used.

Another inventive aspect is a novel method of simulating a fire extinguisher in order to train a user. The method entails a step of displaying a simulation of a fire on a display device held by a holder mounted to a central member to which an electronic control module is mounted and a step of sensing movement of a trigger mechanism by a trigger sensor, and a step of transmitting a signal from the electronic control module to the display device to cause the display device to simulate the fire extinguisher discharging a fire-suppressing substance toward the fire. The method may entail a further step of sensing a removal of a pin using a pin sensor. The method may be performed using infrared (IR) sensors for both the trigger sensor and the pin sensor although in other variants the sensors may be other types of sensors.

In one particular implementation of the method, the step of transmitting the signal is via a Bluetooth® connection, e.g. a Bluetooth® Low Energy connection. As noted above, another short-range wireless data communication technology may be used. In a variant, as noted above, the data communication may be via cable or wired connection.

The method may include a step of attaching one of a plurality of differently sized tanks using an adapter collar. In a variant, the adapter collar may include a load sensor to measure the weight of the tank that has been attached. This weight measurement can be used by the application to predict the volume of fire-suppressing substance in the tank and thus to more accurately simulate when the tank is emptied.

As noted above, the method may be performed using a tablet as the display device although in other variants the method may be performed using a different type of display device. The tablet executes an application that realistically simulates the fire and the fire-fighting activity in order to train the user in the operation of a fire extinguisher.

This method of simulating the fire extinguisher may be performed using an augmented reality engine that executes on the display device (e.g. a tablet).

In one optional implementation, the application may present a user interface (screen) on the display device to enable the user to specify a type of fire-suppressing substance to be simulated. For example, the user may specify (or select from a menu) whether the substance is a wet chemical, foam, carbon dioxide, or powder. The application will then accurately display the spray of the chosen substance as well as its effect on the fire. The application may also enable the user to specify the nature of the fire (i.e. the material or materials on fire) so as to enable the user to better understand the effect of certain types of substances on different types of fires. The application may display a selection of types of fires based on standard classes: Class A (ordinary fire), Class B (flammable liquid fire), Class C (electrical fire), Class D (flammable metal fire) and Class K (kitchen fire).

It should be understood that the embodiment depicted in the figures is presented as an example only. The particular design shown is believed to be the best mode of implementing the present invention but it should be appreciated that many variations in the mechanism(s) may be made without departing from the inventive concept(s) presented herein.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A fire extinguisher training device comprising:
a display device for displaying imagery of a fire;
a holder for holding the display device;
a central member to which the holder is mounted;
an electronic control module mounted to the central member;

a trigger mechanism; and a trigger sensor for sensing movement of the trigger mechanism, wherein the electronic control module is communicatively connected to the trigger sensor and also to the display device; and a pin sensor for sensing a removal of a pin, wherein the pin sensor is also communicatively connected to the electronic control module such that the display device only simulates the fire extinguisher discharging a fire-suppressing substance toward the fire once the pin sensor detects that the pin has been removed and the trigger sensor senses the movement of the trigger mechanism;

an adapter collar having a load sensor to measure a weight of a tank that has been attached to predict a volume of fire-suppressing substance in the tank and thus simulate when the tank is emptied.

2. The device of claim 1 further wherein the adapter collar is adapted to attach the central support to one of a plurality of differently sized tanks.

3. The device of claim 1 wherein the trigger mechanism comprises a spring-loaded upper handle and a lower handle which are connected to the central member.

4. The device of claim 1 wherein the trigger sensor is an infrared (IR) sensor.

5. The device of claim 1 wherein the pin sensor is an infrared (IR) pin sensor.

6. The device of claim 1 wherein the electronic control module is communicatively connected to the display device via a wireless connection.

7. The device of claim 1 wherein the electronic control module is communicatively connected to the display device via a Bluetooth® connection.

8. The device of claim 1 further comprising a housing that attaches to the central member for covering the electronic control module, wherein the housing has light indicators.

9. The device of claim 8 wherein the light indicators comprise a power LED, a charging LED and a full tank LED.

10. The device of claim 1 wherein the display device is a tablet having a memory and a processor for storing and executing an application to display a simulation of a fire.

11. The device of claim 10 wherein the application executing on the tablet provides an augmented reality (AR) simulation.

12. The device of claim 3 wherein the trigger mechanism comprises a spring between the upper and lower handles.

13. The device of claim 10 wherein the application is configured to request an identifier from the electronic control module to determine if the application and the electronic control module have already been calibrated.

14. A method of simulating a fire extinguisher, the method comprising:

displaying a simulation of a fire on a display device held by a holder mounted to a central member to which an electronic control module is mounted;

sensing a removal of pin using a pin sensor;

sensing movement of a trigger mechanism by a trigger sensor; and transmitting a signal from the electronic control module to the display device to cause the display device to simulate the fire extinguisher discharging a fire-suppressing substance toward the fire;

measuring, using a load sensor, a weight of the tank that has been attached to predict a volume of fire-suppressing substance in the tank and thus to simulate when the tank is emptied.

15. The method of claim 14 wherein the transmitting the signal is via a Bluetooth® connection.

16. The method of claim 14 further comprising attaching one of a plurality of differently sized tanks using an adapter collar.

17. The method of claim 14 wherein the display device is a tablet having a memory and a processor for storing and executing an application to display the simulation of the fire.

18. The method of claim 14 wherein the trigger sensor and the pin sensor are both infrared (IR) sensors.

* * * * *